US009311622B2

(12) United States Patent
Karve et al.

(10) Patent No.: US 9,311,622 B2
(45) Date of Patent: Apr. 12, 2016

(54) RESOLVING MUTATIONS IN A PARTIALLY-LOADED SPREADSHEET MODEL

(71) Applicants:Amod Karve, Clifton, NJ (US); Niklaus Haldimann, New York, NY (US)

(72) Inventors: Amod Karve, Clifton, NJ (US); Niklaus Haldimann, New York, NY (US)

(73) Assignee: Google Inc., Mountain View, CA (US)

( * ) Notice: Subject to any disclaimer, the term of this patent is extended or adjusted under 35 U.S.C. 154(b) by 471 days.

(21) Appl. No.: 13/741,691

(22) Filed: Jan. 15, 2013

(65) Prior Publication Data

US 2015/0193734 A1 Jul. 9, 2015

(51) Int. Cl.
*G06Q 10/10* (2012.01)

(52) U.S. Cl.
CPC ........................................ *G06Q 10/10* (2013.01)

(58) Field of Classification Search
CPC ............ G06F 17/30876; G06F 17/246; G06F 17/30893; G06F 17/3089; G06F 9/52; G06Q 10/101; G06Q 50/01; G06Q 10/10
USPC .......................................... 709/216, 219, 220
See application file for complete search history.

(56) References Cited

U.S. PATENT DOCUMENTS

| 5,528,743 | A | 6/1996 | Tou et al. |
| 5,758,358 | A | 5/1998 | Ebbo |
| 5,761,669 | A | 6/1998 | Montague et al. |
| 5,793,966 | A | 8/1998 | Amstein et al. |
| 5,895,476 | A | 4/1999 | Orr et al. |
| 5,930,813 | A | 7/1999 | Padgett et al. |
| 6,006,239 | A | 12/1999 | Bhansali et al. |
| 6,049,664 | A | 4/2000 | Dale et al. |
| 6,169,999 | B1 | 1/2001 | Kanno |
| 6,243,706 | B1 | 6/2001 | Moreau et al. |
| 6,327,584 | B1 | 12/2001 | Xian et al. |
| 6,330,046 | B1 | 12/2001 | Ishitaka et al. |
| 6,341,305 | B2 | 1/2002 | Wolfe |
| 6,342,906 | B1 * | 1/2002 | Kumar et al. ................. 715/751 |
| 6,377,354 | B1 | 4/2002 | Nguyen et al. |
| 6,418,441 | B1 | 7/2002 | Call |
| 6,501,779 | B1 | 12/2002 | McLaughlin et al. |
| 6,512,531 | B1 | 1/2003 | Gartland |

(Continued)

OTHER PUBLICATIONS

Abraham et al., "Mutation Operators for Spreadsheets," Software Engineering, IEEE Transactions on , vol. 35, No. 1, pp. 94, 108, Jan.-Feb. 2009 doi: 10.1109/TSE.2008.73 URL: http://ieeexplore.ieee.org/stamp/stamp.jsp?tp=&arnumber=4609389&isnumber=4771845.*

(Continued)

*Primary Examiner* — Kostas Katsikis
(74) *Attorney, Agent, or Firm* — Ropes & Gray LLP

(57) ABSTRACT

A method of resolving mutations in a partially-loaded spreadsheet model includes loading onto a client computer a first chunk of a spreadsheet stored on a server, where the first chunk represents a first range of cells in the spreadsheet, and requesting a second chunk of the spreadsheet from the server, where the second chunk represents a second range of cells in the spreadsheet. The method further includes storing a plurality of pending user mutations on the client computer generated by a user on the client computer, where the plurality of pending user mutations are applied to the first chunk, and receiving from the server a plurality of collaborator mutations and the second chunk. The method further includes transforming the plurality of pending user mutations against the plurality of collaborator mutations, and applying the transformed plurality of pending user mutations to the second chunk.

31 Claims, 5 Drawing Sheets

(56) References Cited

U.S. PATENT DOCUMENTS

| | | | |
|---|---|---|---|
| 6,662,210 B1 | 12/2003 | Carleton et al. | |
| 6,705,584 B2 | 3/2004 | Hiroshima et al. | |
| 6,717,593 B1 | 4/2004 | Jennings | |
| 6,737,289 B2 | 5/2004 | Woo et al. | |
| 6,879,997 B1 | 4/2005 | Ketola et al. | |
| 6,967,704 B2 | 11/2005 | Hoshino | |
| 6,972,748 B1 | 12/2005 | Lang | |
| 6,983,316 B1 | 1/2006 | Milne et al. | |
| 7,009,626 B2 | 3/2006 | Anwar | |
| 7,026,100 B2 | 4/2006 | Nakata et al. | |
| 7,031,954 B1 | 4/2006 | Kirsch | |
| 7,035,910 B1 | 4/2006 | Dutta et al. | |
| 7,039,643 B2 | 5/2006 | Sena et al. | |
| 7,231,597 B1 | 6/2007 | Braun et al. | |
| 7,233,951 B1* | 6/2007 | Gainer et al. | |
| 7,287,094 B2 | 10/2007 | Mogul | |
| 7,437,421 B2 | 10/2008 | Bhogal et al. | |
| 7,478,330 B1 | 1/2009 | Branson et al. | |
| 7,487,448 B2 | 2/2009 | Emerson et al. | |
| 7,491,399 B2 | 2/2009 | Vakharia | |
| 7,529,778 B1 | 5/2009 | Dewey et al. | |
| 7,624,145 B2 | 11/2009 | Junuzovic et al. | |
| 7,656,543 B2 | 2/2010 | Atkins | |
| 7,680,932 B2 | 3/2010 | Defaix et al. | |
| 7,698,379 B2 | 4/2010 | Dutta et al. | |
| 7,712,016 B2 | 5/2010 | Jones et al. | |
| 7,774,703 B2 | 8/2010 | Junuzovic et al. | |
| 7,792,788 B2 | 9/2010 | Melmon et al. | |
| 7,836,148 B2 | 11/2010 | Popp et al. | |
| 7,890,928 B2 | 2/2011 | Patrudu | |
| 7,920,240 B2 | 4/2011 | Yonemura | |
| 7,953,696 B2 | 5/2011 | Davis et al. | |
| 7,958,448 B2 | 6/2011 | Fattic, II et al. | |
| 7,983,416 B2 | 7/2011 | Takashima et al. | |
| 8,019,780 B1 | 9/2011 | Pinkerton et al. | |
| 8,044,961 B2 | 10/2011 | Opstad et al. | |
| 8,065,604 B2 | 11/2011 | Blankinship | |
| 8,073,812 B2 | 12/2011 | Curtis | |
| 8,327,127 B2 | 12/2012 | Suryanarayana et al. | |
| 8,327,812 B2 | 12/2012 | Vuk | |
| 8,395,733 B2 | 3/2013 | Ataka et al. | |
| 8,484,561 B1 | 7/2013 | Lemonik et al. | |
| 8,566,708 B1 | 10/2013 | Pereira et al. | |
| 8,595,622 B1 | 11/2013 | Pereira et al. | |
| 8,738,706 B1* | 5/2014 | Grieve et al. | 709/205 |
| 2002/0095399 A1* | 7/2002 | Devine | G06F 17/3089 |
| 2003/0009603 A1* | 1/2003 | Ruths et al. | 709/318 |
| 2003/0014406 A1* | 1/2003 | Faieta | G06F 17/3089 |
| 2003/0014513 A1* | 1/2003 | Ruths et al. | 709/223 |
| 2003/0018719 A1* | 1/2003 | Ruths et al. | 709/205 |
| 2004/0215825 A1 | 10/2004 | Pfitzner | |
| 2004/0215826 A1 | 10/2004 | Pfitzner | |
| 2004/0216090 A1 | 10/2004 | Kaler et al. | |
| 2005/0091291 A1 | 4/2005 | Kaler et al. | |
| 2005/0125461 A1 | 6/2005 | Filz | |
| 2005/0131887 A1 | 6/2005 | Rohrabaugh et al. | |
| 2005/0185636 A1 | 8/2005 | Bucher | |
| 2005/0200896 A1 | 9/2005 | Narusawa et al. | |
| 2005/0234943 A1 | 10/2005 | Clarke | |
| 2006/0031751 A1 | 2/2006 | Ehud | |
| 2006/0075332 A1 | 4/2006 | Fairweather et al. | |
| 2006/0101071 A1 | 5/2006 | Henderson | |
| 2006/0200755 A1 | 9/2006 | Melmon et al. | |
| 2006/0230344 A1 | 10/2006 | Jennings et al. | |
| 2006/0248121 A1 | 11/2006 | Cacenco et al. | |
| 2007/0033654 A1 | 2/2007 | Wilson | |
| 2007/0061714 A1 | 3/2007 | Stuple et al. | |
| 2007/0070066 A1 | 3/2007 | Bakhash | |
| 2007/0073899 A1 | 3/2007 | Judge et al. | |
| 2007/0094601 A1 | 4/2007 | Greenberg et al. | |
| 2007/0186157 A1 | 8/2007 | Walker et al. | |
| 2007/0208992 A1 | 9/2007 | Koren | |
| 2007/0220068 A1 | 9/2007 | Thompson et al. | |
| 2007/0233811 A1 | 10/2007 | Rochelle et al. | |
| 2007/0239695 A1 | 10/2007 | Chakra et al. | |
| 2007/0279572 A1 | 12/2007 | Yonemura | |
| 2007/0288637 A1 | 12/2007 | Layton et al. | |
| 2007/0299857 A1 | 12/2007 | Gwozdz et al. | |
| 2008/0028302 A1 | 1/2008 | Meschkat | |
| 2008/0040659 A1 | 2/2008 | Doyle | |
| 2008/0059539 A1 | 3/2008 | Chin et al. | |
| 2008/0082604 A1 | 4/2008 | Mansour et al. | |
| 2008/0126943 A1 | 5/2008 | Parasnis et al. | |
| 2009/0112990 A1* | 4/2009 | Campbell et al. | 709/205 |
| 2009/0192845 A1 | 7/2009 | Gudipaty et al. | |
| 2009/0235181 A1 | 9/2009 | Saliba et al. | |
| 2009/0276455 A1* | 11/2009 | Yu | G06F 17/30011 |
| 2009/0328063 A1 | 12/2009 | Corvera et al. | |
| 2010/0030578 A1 | 2/2010 | Siddique et al. | |
| 2010/0083096 A1 | 4/2010 | Dupuis-Latour et al. | |
| 2010/0107048 A1* | 4/2010 | Takahara | 715/219 |
| 2010/0153948 A1 | 6/2010 | Schreiber et al. | |
| 2010/0218099 A1 | 8/2010 | van Melle et al. | |
| 2010/0235763 A1 | 9/2010 | Massand | |
| 2010/0241749 A1 | 9/2010 | Rasmussen et al. | |
| 2010/0245256 A1 | 9/2010 | Estrada et al. | |
| 2010/0251122 A1 | 9/2010 | Lee et al. | |
| 2011/0055329 A1* | 3/2011 | Abt et al. | 709/205 |
| 2011/0066957 A1 | 3/2011 | Prats et al. | |
| 2011/0085211 A1 | 4/2011 | King et al. | |
| 2011/0154185 A1 | 6/2011 | Kern et al. | |
| 2011/0178981 A1 | 7/2011 | Bowen et al. | |
| 2011/0252300 A1* | 10/2011 | Lloyd et al. | 715/217 |
| 2011/0252339 A1* | 10/2011 | Lemonik et al. | 715/753 |
| 2011/0302194 A1 | 12/2011 | Gonzalez et al. | |
| 2011/0302237 A1 | 12/2011 | Knight et al. | |
| 2012/0072819 A1 | 3/2012 | Lindner et al. | |
| 2012/0110445 A1 | 5/2012 | Greenspan et al. | |
| 2012/0159298 A1* | 6/2012 | Fisher et al. | 715/215 |
| 2012/0331373 A1 | 12/2012 | Lindner et al. | |
| 2013/0007183 A1 | 1/2013 | Sorenson, III et al. | |
| 2013/0159832 A1* | 6/2013 | Ingargiola | G06Q 40/00 715/220 |
| 2013/0262974 A1* | 10/2013 | Anstis et al. | 715/217 |
| 2015/0193406 A1 | 7/2015 | Lemonik et al. | |
| 2015/0195311 A1 | 7/2015 | Lemonik et al. | |
| 2015/0199222 A1 | 7/2015 | Day-Richter et al. | |
| 2015/0199270 A1 | 7/2015 | Day-Richter et al. | |
| 2015/0199316 A1 | 7/2015 | Cairns et al. | |
| 2015/0199317 A1 | 7/2015 | Lemonik et al. | |
| 2015/0199318 A1 | 7/2015 | Lemonik et al. | |

OTHER PUBLICATIONS

Bibi et al., "A Platform for Delivering Multimedia Presentations on Cultural Heritage," 2010 14th Panhellenic Conference on Informatics, pp. 175-179.

Cairns, "System and Method of Secure Communication Between Multiple Child Frames," unpublished U.S. Appl. No. 13/493,798, filed Jun. 11, 2012, 1-47.

Cayenne-McCall, "Synchronous 3D Document Collaboration," Pace University, Department of Computer Science; Nov. 2008. (42 Pages).

Citro, "Conflict Management for Real-Time Collaborative Editing in Mobile Replicated Architectures," 2007, Australian Computer Society, Inc., Thirteenth Austrailian Computer Science Conference (ACSC2007), pp. 115-124.

Conner, Zoho 4 Everyone, 2008, downloaded from the internet http://techbus.safaribooksonline.com/print?xmlid=9780768687835/ch011ev1 sec1 , Aug. 21, 2012, p. 1-17.

DeJean, David, "Online office apps get real: Google Docs vs. ThinkFree vs. Zoho, Web-based suites have become real challengers to desktop applications," Jul. 16, 2008, Computerworld [online]. Retrieved from the Internet: <URL: http://www.computerworld.com/s/article/pri nt/91 08 799/On line_office_apps get_real_Google D ocs vs ThinkFree vs. Zoho> (7 pp.).

Ellis et al., "Concurrency Control in Groupware Systems," ACM 1989, pp. 399-407.

Ellis et al., Groupware Some Issues and Experiences, Communications of the Association for Computing Machinery, ACM, 34:1, Jan. 1, 1991,38-58.

Googlepedia: The Ultimate Google Resource, Third Edition, pp. 276-287 (2008).

(56) References Cited

OTHER PUBLICATIONS

Hodel et al., "Supporting Collaborative Layouting in Word Processing," University of Zurich, Department of Inforamtics; Zurich, Switzerland, 2004 (18 page).

Holzer, "Google Docs 4 Everyone" http://www.scribd.com/doc/14119795/Google-Docs-4-Everyone Published Feb. 2009.

Huang et al., "A General Purpose Virtual Collaboration Room," Google 1999, pp. 1-9.

Ignat et al., "Awareness of Concurrent Changes in Distributed Software Development," Nancy-Universite, France 2008 (9 pages).

Ignat et al., "CoDoc: Multi-mode Collaboration over Documents," ETII Surich, Institute for Information Systems; Zurich, Switzerland, 2004 (15 pages).

Kjaer, "Timing and Synchronization in JavaScript", Dev. Opera, Sections: "The Basics", "Event Queing", "Long Running Scripts" and "Advice on Timing", Feb. 27, 2007, downloaded from URL: http/dev.opera.com/articles/view/timing-and-synchronization-injavascript/, pp. 1-9.

Lemonik et al.,"System and Method for Providing Data Management Services," unpublished U.S. Appl. No. 13/224,860 filed Sep. 2, 2011, pp. 1-88.

Lemonik et al., "System and Method for Providing Real-Time Collaborative Document Editing Services," unpublished U.S. Appl. No. 13/224,573, filed Sep. 2, 2011, pp. 1-90.

Lemonik et al., "System and Method for Updating an Object Instance Based on Instructions Received from Multiple Devices," unpublished U.S. Appl. No. 13/224,479, filed Sep. 2, 2011, pp. 1-91.

Nasir et al., "Collaborative Report Creation System for Industrial Use," Yamagata University, Graduate School of Science and Engineering; Yamagata, Japan 2009 (6 pages).

Pacull et al., "Duplex: A Distributed Collaborative Editing Environment in Large Scale," ACM 1994, pp. 165-173.

Quinn, "Comparing Online vs. Traditional Office Software, Will desktop or online office software fit your non-profit needs best?" May 21, 2010, courtesy of Idealware, TechSoup.org [online]. Retrieved from the Internet L:http://www.techsoup.org/learningcenter/software/page11852.cfm (4 pp.).

Raman, "Cloud Computing and Equal Access for All," Google Inc. 2008 (4 pages).

Shen et al., "Flexible Merging for Asynchronouse Collaborative Systems," Griffith University, School of Computing an Information Technology, Brisbane, Australia 2002 (18 pages).

Shen et al., "Integrating Advanced Collaborative Capabilities into Web-Based Word Processors," Nauyang Technological University, School of Computer Engineering, Singapore 2007 (8 pages).

Sun et al., "Operational Transformation in Real-Time Group Editors: Issues, Algorithms, and Achievements," 1998, ACM Conference on Computer-Supported Cooperative Work, pp. 1-10.

Tyson, Herb, "Microsoft Word 2007 Bible," 2007, pp. 112-115, p. 467, pp. 523-525, p. 798.

Unpublished U.S. Appl. No. 13/224,530, filed Sep. 2, 2011.

Using Adobe Buzzword, 2008, pp. 1-35.

Wang et al. Google Wave Operational Transformation, Jul. 1, 2010, 1-6, retrieved from the Internet Feb. 14, 2012: http:/1 wave-protocol.googlecode.comfhg/Whitepapers/operational-transform/operational-transform.html.

Wikipedia, "Operational Transformation," http://en.wikipedia.org/wiki/Operation_transformation, Jun. 3, 2008. Retrieved from Internet: http://web.archive.org/web/20080603061805/http://en.wikipedia.org/wiki/Operational_transformation.

Wikipedia, the free encyclopedia, "Model-View-Controller," downloaded on Nov. 16, 2010 [online]. Retrieved from the Internet: URL:http://en.wikipedia.org/wiki/Modei%E2%80%93view%E2%80%93controller, pp. 1-10.

* cited by examiner

300

|    | A | B | C | D | E |
|----|---|---|---|---|---|
| 1  |   |   |   |   |   |
| 2  |   |   |   |   |   |
| 3  |   |   |   |   |   |
| 4  |   |   |   |   |   |
| 5  |   |   |   |   |   |
| 6  |   |   |   |   |   |
| 7  |   |   |   |   |   |
| 8  |   |   |   |   |   |
| 9  |   |   |   |   |   |
| 10 |   |   |   |   |   |
| 11 |   |   |   |   |   |
| 12 |   |   |   |   |   |
| 13 |   |   |   |   |   |
| 14 |   |   |   |   |   |

302 (rows 1–7), 304 (rows 8–14)

| A | Set A2 = 2 |
| B | Set A3 = 4 |
| C | Set B3 = A2+A3 |
| D | Set C10 = A2 x A3 |
| E | Set E9 = B3 + C10 |
| F | Set D1 = 3 |
| G | Set D12 = 7 |
| H | Set A3 = 5 |
| I | Delete Row 6 |
| J | Add Row 11 |
| K | Set E4 = 9 |
| L | Delete D12 |

Snapshot S1 (after E)
Snapshot S2 (after J)

FIG. 4

RESOLVING MUTATIONS IN A PARTIALLY-LOADED SPREADSHEET MODEL

BACKGROUND

Cloud computing and cloud storage systems provide users with the ability to store and edit electronic documents and other files on a remote network rather than on a local computer. This allows users the ability to access the remotely stored files from any device that is capable of connecting with the remote network, for example using a web browser over an Internet connection. Users typically log into an account on the cloud computing system using a username and password. The cloud computing system provides a user interface for users to view, edit, and manage files stored on the system. Cloud computing systems also provide users the ability to share files with other users and to allow collaboration between users on the same file.

One type of file that may be stored in a cloud computing system is a spreadsheet. Spreadsheets are usually arranged as a set of rows and columns that define cells, where each cell may contain data, formulae, or other information. Spreadsheets range in size and larger spreadsheets may contain many rows or columns of information. Typically, when a file from a cloud computing system is loaded onto a client computer the data contents of the entire file are sent from the server to the client computer. For large spreadsheets, the amount of data may range in the megabytes or above. Downloading the information to the client computer may take a long time and may also slow down the rendering process on the client computer. If a user only wants to edit a certain portion of the spreadsheet, loading the entire spreadsheet onto the client computer wastes time and resources.

In addition, multiple users may have access to the spreadsheet and may edit the spreadsheet concurrently. While a user on client computer is editing the spreadsheet, the spreadsheet is not instantaneously updated with edits submitted by other users. Rather, the cloud computing system coordinates edits received from various users. When a cloud computing system sends edits made by other collaborators to a client computer, the process of reconciling the collaborator edits with the edits made by the current user on the client computer is complex and depends upon the data structure of the spreadsheet.

SUMMARY

The systems and methods described herein provide a way for collaborator and user mutations, or edits, to be resolved in a partially-loaded spreadsheet model on a cloud computing system. A cloud computing system includes one or more servers for storing files for a user, including spreadsheets. Each spreadsheet is represented by a plurality of chunks, where each chunk encompasses a range of cells in the spreadsheet. The cloud computing system maintains a set of chunks for the spreadsheet. Each user with write access to the spreadsheet may load chunks from the cloud storage system, where they are locally stored. Each client computer can then dynamically change its locally-stored set of chunks independent from the cloud storage system and other users. A mutation log associated with the spreadsheet is also stored on the cloud computing system. The mutation log records all mutations, or edits, made to the spreadsheet by a number of users with write access to the spreadsheet. The cloud computing system receives mutations from users, records them in the mutation log, and then broadcasts the mutation to other collaborators. When a user on a client computer requests the display of a first chunk of a spreadsheet stored on the cloud computing system, the cloud computing system applies the mutations stored in the mutation log to one or more chunks that span the range of cells of the spreadsheet requested. The cloud computing system sends the first chunk to the client computer.

The user may make edits, or mutations, to the first chunk. These mutations are stored in a pending queue on the client computer and are sent in batches to the cloud computing system. User mutations that have not been saved on the cloud computing system are kept in the pending queue. The client computer may request a copy of a second chunk from the cloud computing system. During the time it takes the cloud computing system to receive the second chunk from the cloud computing system, the user may have made additional user mutations that are stored in the pending queue. Mutations made by collaborators are also sent to the client computer. The pending user mutations in the pending queue are operationally transformed against the collaborator mutations before being sent to the cloud computing system. Operational transforms ensure consistency of results regardless of the order in which the mutations are applied. In addition, the collaborator mutations are transformed against the pending user mutations before being applied to the first chunk on the client computer. When the client computer receives the second chunk from the cloud computing system, the transformed pending user mutations are applied to the second chunk. In addition, the second chunk and the collaborator mutations have associated revision numbers. Any collaborator mutation with a revision number higher than the revision number of the second chunk is applied to the second chunk. When all the mutations have been applied, the client computer displays the second chunk to the user.

One aspect described herein discloses a method of resolving mutations in a partially-loaded spreadsheet model. The method includes loading onto a client computer a first chunk of a spreadsheet stored on a server, where the first chunk represents a first range of cells in the spreadsheet, and requesting a second chunk of the spreadsheet from the server, where the second chunk represents a second range of cells in the spreadsheet. The method further includes storing a plurality of pending user mutations on the client computer generated by a user on the client computer, where the plurality of pending user mutations are applied to the first chunk, and receiving from the server a plurality of collaborator mutations and the second chunk. The method further includes transforming the plurality of pending user mutations against the plurality of collaborator mutations, and applying the transformed plurality of pending user mutations to the second chunk.

Another aspect described herein discloses a system for resolving mutations in a partially-loaded spreadsheet model, where the system includes a client computer. The client computer is configured to communicate with a server using a communication connection, load a first chunk of a spreadsheet stored on the server, where the first chunk represents a first range of cells in the spreadsheet, and request a second chunk of the spreadsheet from the server, where the second chunk represents a second range of cells in the spreadsheet. The client computer is further configured to store a plurality of pending user mutations generated by a user on the client computer, where the plurality of pending user mutations are applied to the first chunk, and receive from the server a plurality of collaborator mutations and the second chunk. The client computer is further configured to transform the plurality of pending user mutations against the plurality of collaborator mutations, and apply the transformed plurality of pending user mutations to the second chunk.

Another aspect described herein discloses a method for resolving mutations in a partially-loaded spreadsheet model, where the method includes loading onto a client computer a first chunk of a spreadsheet stored on a server, where the first chunk represents a first range of cells in the spreadsheet. The method further includes searching local memory of the client computer for a second chunk of the spreadsheet, where the second chunk represents a second range of cells in the spreadsheet, and storing a plurality of pending user mutations on the client computer generated by a user on the client computer, where the plurality of pending user mutations are applied to the first chunk. The method further includes receiving from the server a plurality of collaborator mutations and retrieving the second chunk from the local memory. The method further includes transforming the plurality of pending user mutations against the plurality of collaborator mutations, and applying the transformed plurality of pending user mutations to the second chunk.

BRIEF DESCRIPTION OF THE DRAWINGS

The methods and systems may be better understood from the following illustrative description with reference to the following drawings in which:

FIG. 3 shows a partially-loaded spreadsheet model in accordance with an implementation as described herein;

FIG. 4 shows a mutation log for a partially-loaded spreadsheet model in accordance with an implementation as described herein;

DETAILED DESCRIPTION

Figure 1:
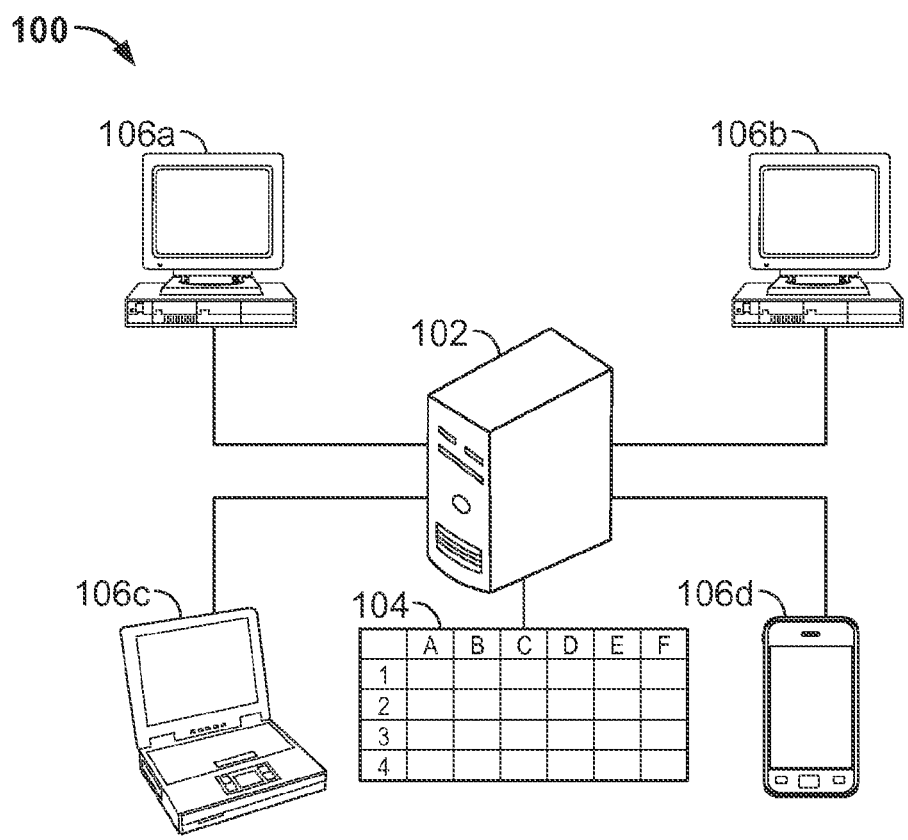
FIG. 1 shows a client-server system for resolving mutations in a partially-loaded spreadsheet model in accordance with an implementation as described herein.

To provide an overall understanding of the systems and methods described herein, certain illustrative embodiments will now be described, including systems and methods for resolving collaborator and user mutations in a partially-loaded spreadsheet model on a cloud computing system. However, it will be understood that the systems and methods described herein may be adapted and modified as is appropriate for the application being addressed and that the systems and methods described herein may be employed in other suitable applications, and that such other additions and modifications will not depart from the scope thereof. In particular, a server or system as used in this description may be a single computing device or multiple computing devices working collectively and in which the storage of data and the execution of functions are spread out amongst the various computing devices. One or more servers may host a cloud computing system, a cloud storage system, or both operating in tandem.

Aspects of the systems and methods described herein provide a cloud computing system capable of delivering a partially-loaded spreadsheet model using dynamically-sized chunks. A spreadsheet may be represented by one or more chunks, where each chunk encompasses a range of cells in the spreadsheet. One or more servers hosting a cloud computing system maintains a set of chunks for the spreadsheet. Each user with write access to the spreadsheet may load chunks from the cloud computing system, where they are locally stored. Each client computer can then dynamically change its locally-stored set of chunks independent from the cloud computing system and other user. All chunks are initially empty. A mutation log is associated with the spreadsheet and stored on the server. The mutation log records all mutations made by users to the spreadsheet to any chunk of the spreadsheet. When a user on a client computer requests a range of cells of the spreadsheet from the server, the server applies all the mutations stored in the mutation log to one or more of its chunks representing the range of cells of the spreadsheet request and sends the copies of the chunks to the client computer. Partially-loaded spreadsheet models using dynamically-sized chunks are further described in co-pending U.S. patent application number [108827-1126-101], entitled, "DYNAMICALLY SIZING CHUNKS IN A PARTIALLY LOADED SPREADSHEET MODEL," which is incorporated by reference herein in its entirety.

The user may make mutations to the first chunk. These mutations are stored in a pending queue on the client computer and are sent in batches to the cloud computing system. User mutations that have not been saved on the cloud computing system are kept in the pending queue. The client computer may request a copy of a second chunk from the cloud computing system. A set of pending user mutations may also be sent to the cloud computing system along with the request for the second chunk. While the cloud computing system generates a copy of the second chunk to send to the client computer, the user may have made additional user mutations that are stored in the pending queue. Mutations made by collaborators are also sent to the client computer. The pending user mutations and collaborator mutations are reconciled using operational transformations. The pending user mutations in the pending queue are transformed against the collaborator mutations before being sent to the cloud computing system. In addition, the collaborator mutations are transformed against the pending user mutations before being applied to the first chunk on the client computer. The pending user mutations and collaborator mutations may affect more than one chunk. For example, the addition or deletion of rows or columns, changes to cell formulae in the first chunk, or changes to cell values in the first chunk that are referenced in cells in the second chunk may affect the values of cells in the second chunk. Thus, when the client computer receives the second chunk from the cloud computing system the transformed pending user mutations are applied to the second chunk. In addition, the second chunk and the collaborator mutations have associated revision numbers. Any collaborator mutation with a revision number higher than the revision number of the second chunk is applied to the second chunk. When all the mutations have been applied, the client computer displays the second chunk to the user. In this manner, the client computer resolves user and collaborator mutations when loading and displaying chunks of a partially-loaded spreadsheet stored on a cloud computing system.

A cloud computing system stores files for users and allows users to view, edit, share, and download those files using client computers connected to the cloud computing system over a remote network. One type of file that a cloud computing system may store is a spreadsheet. FIG. 1 illustrates a client-server system, where the server supports a cloud computing system for storing spreadsheets and other files. System 100 includes one or more servers 102 which collectively provide a cloud computing system for storing files such as spreadsheet file 104. System 100 also includes a number of client computers 106a through 106d which connect to servers 102 through a remote network, such as the Internet. Each one of client computers 106a through 106d may be a desktop computer, laptop computer, mobile device, tablet, or any other computing device capable of connecting with servers 102. The remote network connection may be a wired or wireless Internet connection, local area network (LAN), wide area network (WAN), Wi-Fi network, Ethernet, or any other type of known connection.

Figure 2:
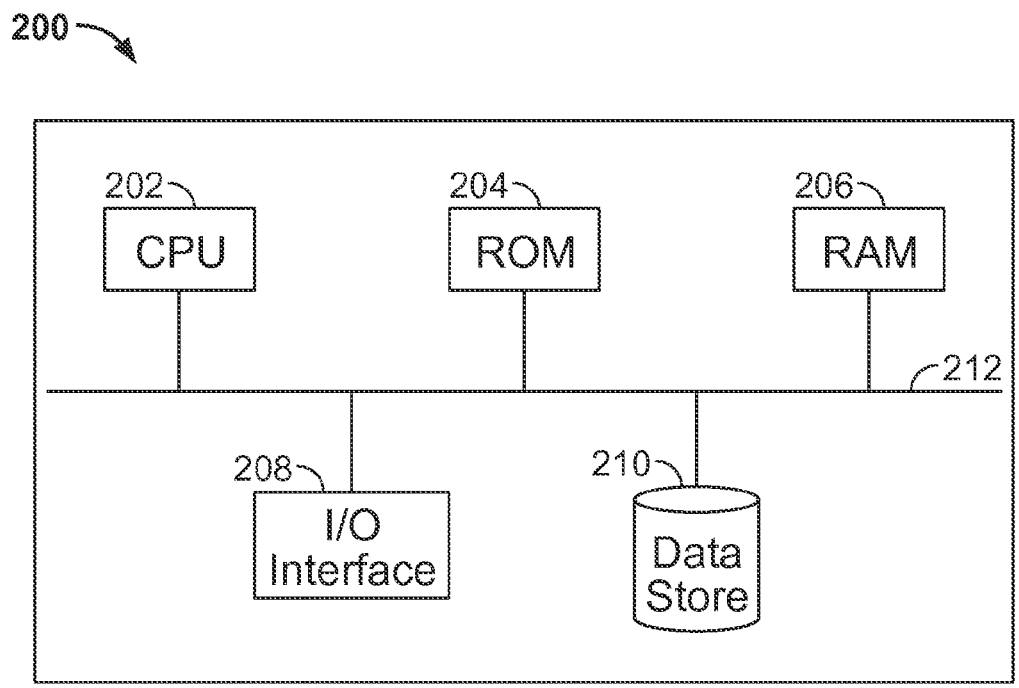
FIG. 2 shows the components of a client computer configured for resolving mutations in a partially-loaded spreadsheet model in accordance with an implementation as described herein.

A client computer capable of connecting with a cloud computing system is now described in more detail. Client computer 200 shown in FIG. 2 includes a central processing unit (CPU) 202, read only memory (ROM) 204, random access memory (RAM) 206, input/output interface 208, data store 210, and bus 212. Client computer 200 may have additional components that are not illustrated in FIG. 2. Bus 212 allows the various components of client computer 200 to communicate with each other. Input/output interface 208 allows client computer 200 to communicate with other devices, such as one or more servers hosting the cloud computing system. Data store 210 may store, among other things, code for a web browser for interacting with a cloud computing system and displaying and editing files stored on the cloud computing system. Data store 210 also stores one or more chunks for a spreadsheet loaded from the cloud computing system, for example in the cache of the web browser.

Data store 210 for storing files and programs on client computer 200 may be implemented using non-transitory computer-readable media. Examples of suitable non-transitory computer-readable media include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and readable, once-writeable, or re-writeable CD-ROM and DVD-ROM disks.

A spreadsheet stored on a cloud computing system may be represented by one or more chunks. FIG. 3 shows an example spreadsheet 300 with dynamically-sized chunks. Spreadsheet 300 as illustrated has rows 1 through 14 and columns A through E, although a spreadsheet may include any number of rows and columns. The cloud computing system may represent the entire spreadsheet 300 using one or more chunks, where each chunk represents a range of cells in the spreadsheet. In FIG. 3, chunk 302 represents rows 1 through 7 and chunk 304 represents rows 8 through 14. Chunks may represent any range of rows, columns, or a combination of rows and column ranges. For example, a chunk may represent the first 1,000 rows of a spreadsheet, the second 1,000 rows of a spreadsheet, the first 1,000 columns of the spreadsheet, or a range of cells covered by rows 1 through 1,000 and columns 100 through 200. For a small spreadsheet with 100 rows and 5 columns, the server may only create one chunk. For a large spreadsheet with 10,000 rows and 20 columns, the server may create 10 chunks, each spanning 1,000 rows. A spreadsheet file may include a number of individual sheets, each having its own tab, arranged in a "workbook" structure. Chunks may be created for each sheet within the spreadsheet file.

The server maintains a master set of chunks for a spreadsheet. Each user with write access to the spreadsheet may load chunks from the cloud storage system, where they are locally stored. Each client computer can then dynamically change its locally-stored set of chunks independent from the cloud storage system and other users. The server may initially set the chunks for each user to be identical, but the size and range of the chunks are further customized by the client computer and may be based on the capabilities of the client computer. For example, if the client computer is a desktop computer with a large cache, the chunk sizes may be large. If the client computer is a tablet or mobile device with smaller memory capabilities, the chunk sizes may be small. The chunk sizes may also be based on the bandwidth of the connection between the client computer and the server. The size and range of the chunks are not static, but may be dynamically changed by the client computer and server as edits are made to the spreadsheet. For example, if a user adds many rows to a portion of a spreadsheet covered by one chunk, the client computer may split the chunk into two chunks. If a user deletes many rows from a portion of a spreadsheet covered by one chunk, the client computer may merge the reduced chunk with another chunk. If a user adds one or deletes one row in a chunk, the client computer may adjust the boundaries of adjacent chunks. There may be a tolerance range so that repeated insertion and deletion of cells does not repeatedly invoke the merge and split functions, or the boundary adjustment of chunks. Each chunk has associated ID to uniquely identify it. One of the chunks in the spreadsheet is designated to store metadata information about the entire spreadsheet, such as total number of rows and columns, name of the spreadsheet, chunk IDs, and any other commonly used metadata fields. This chunk may be the first chunk that is normally loaded when a user requests the spreadsheet (e.g. the chunk encompassing row 1 and column 1).

In addition to representing a spreadsheet by one or more dynamically-sized chunks, a mutation log is associated with the spreadsheet. FIG. 4 shows an example of a mutation log 400. The mutation log applies to all chunks of a spreadsheet, so only one log is stored per spreadsheet. Alternatively, each chunk of the spreadsheet may have an associated mutation log. Mutation log 400 stores mutations, or edits, that all users with write access to the spreadsheet send to the cloud computing system, in the order in which they are received. The cloud computing system stores the mutations and also propagates the mutations to each collaborator that is also working on the same spreadsheet. These edits may be to set the value of cells, delete cell values, enter formulae into cells, cut, copy or paste values, add or delete rows and columns, sorting row or column values, filtering row or column values, linking to external data, performing a calculation, or any other operation permissible in an electronic spreadsheet. For example, mutation log 400 stores a number of set value commands, such as "Set A2=2" for mutation A, "Set A3=4" for mutation B, and "Set B3=A2+A3" for mutation C. Mutation log 400 may also store row addition and deletion mutations, such as "Delete Row 6" for mutation I and "Add Row 11" for mutation J. Other mutations not shown in FIG. 4 may also be stored in mutation log 400. In case of conflicting mutations or mutations that occur at the same time, the server may engage various conflict resolution mechanisms to determine the proper order of mutations. The mutations correlate directly to cells, rows or columns, without regard to chunks. This allows the size and range of chunks to change without affecting mutation log 400. The cloud computing system may assign a revision number to each mutation received. The syntax of the mutations is not limited to that shown in FIG. 4 but may encompass any known spreadsheet syntax.

FIG. 4 also shows two snapshots, one taken after mutation E and one taken after mutation J. Snapshots are copies of a chunk generated at a certain time with all the mutations occurring before that time incorporated into the chunk. For example, snapshot S1 of a chunk incorporates mutations A-E while snapshot S2 of a chunk incorporates mutations A-J. Snapshots are created by the cloud computing system to lessen the time it takes to load a chunk to a user. For example, when a user requests a chunk from a cloud computing system after mutation G has been entered, the cloud computing system takes an empty initial copy of the chunk and applies mutations A-G stored in mutation log 400 to the empty chunk to obtain the current state of the chunk, and then sends the chunk to the client computer. If the cloud computing system has created and stored snapshot S1, then it only needs to apply mutations F and G to snapshot S1 of the chunk before sending the copy to the client computer.

When a spreadsheet is first generated in a cloud computing system, one or more chunks are created that represent the cloud computing system. Initially, all the cells in every chunk have no value (i.e. the spreadsheet is empty), such as shown in FIG. 3. As the cloud computing system receives mutations for the spreadsheet from any number of users, the mutations are stored in a mutation log associated with the spreadsheet, such as shown in FIG. 4. The cloud computing system also sends each mutation to the other collaborators who are working on the same spreadsheet, either individually or in batches. When a client computer requests an updated version of a chunk, the cloud computing system applies all the mutations received up to that point and applies it to an empty version of the chunk (or a snapshot if one has been created). After all the mutations have been applied, a copy of the chunk is sent to the client computer. For example, mutation log 400 depicted in FIG. 4 is associated with empty spreadsheet 300 in FIG. 3. One or more users send mutations A-E shown in FIG. 4 to the cloud computing system. The cloud computing system stores these mutations in mutation log 400. Then a user on a client computer requests a copy of chunk 302 or chunk 304 of spreadsheet 300. Alternatively, the cloud computing system may save a snapshot of both chunks after mutation E has occurred, such as snapshot S1 illustrated in FIG. 4.

Figure 5:
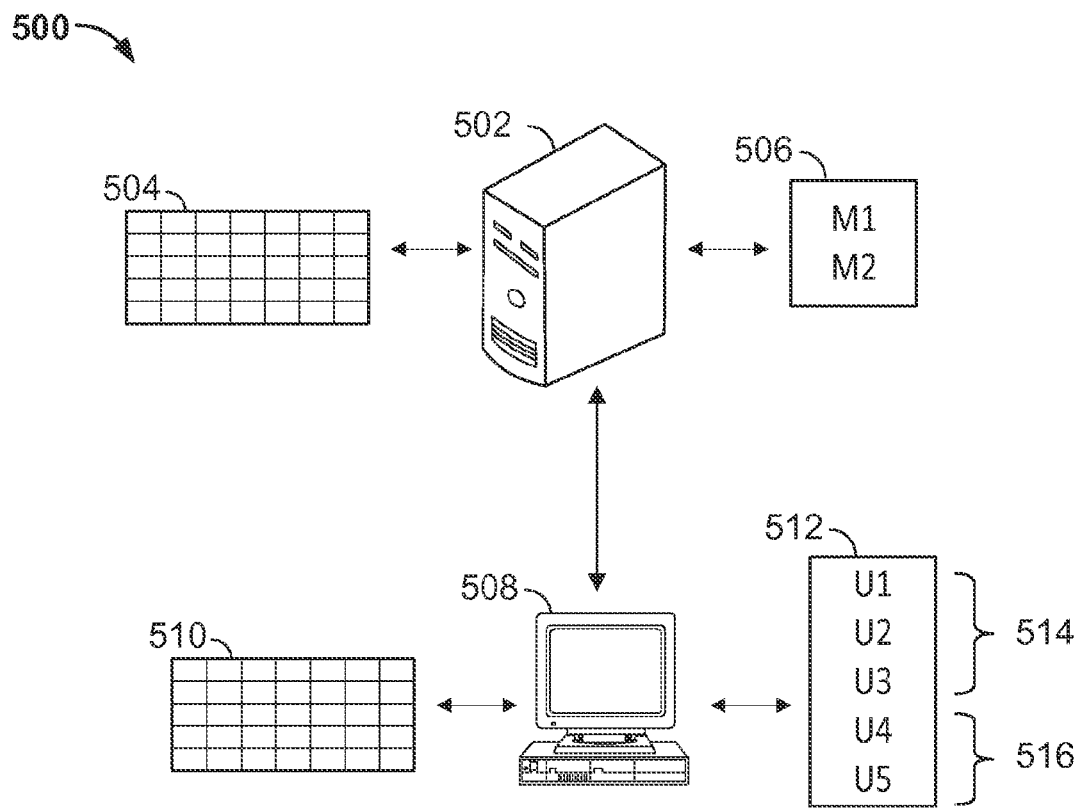
FIG. 5 shows another client-server system for resolving mutations in a partially-loaded spreadsheet model in accordance with an implementation as described herein.

After a client computer has received a chunk from the cloud computing system, a user on the client computer may make edits to the locally-stored chunk. These mutations change the copy of the chunk on the client computer but are not instantaneously transmitted to the cloud computing system. Rather, the user mutations are stored in a pending mutation queue. For example, FIG. 5 illustrates a client-server system 500 for providing a cloud computing and computing service for a client computer. Client computer 508 connects with one or more servers 502 providing a cloud computing and cloud storage service. Server 502 stores spreadsheets, such as spreadsheet 504, that may be partially loaded onto client computer 508 using dynamically-sized chunks. Client computer 508 requests a first chunk of spreadsheet 504 from server 502. The server sends client computer 508 a copy of the first chunk so that client computer 508 has a local copy of the spreadsheet, shown as spreadsheet 510, which includes the first chunk sent by server 502. A user on client computer 508 is free to edit the chunk received from server 502.

Client computer 508 stores user mutations in a pending queue 512, such as user mutations U1-U5. One or more user mutations stored in pending queue 512 are sent to server 502 as a save request. For example, user mutations U1-U3 are sent as a batch to server 502 as part of a periodic save request. User mutations U1-U3 are placed in sent pending queue 514, a subset of pending queue 512 for mutations that have been sent to the server but have not been acknowledged as saved by server 502. The server stores user mutations U1-U3 as well as mutations received from collaborators in the mutation log associated with the spreadsheet, such as mutation log 400 in FIG. 4. Server 502 sends client computer 508 a confirmation that use mutations U1-U3 have been saved. Once client computer 508 receives the confirmation, user mutations U1-U3 may be moved out of pending queue 512. User mutations that have not been sent to the server yet, such as mutations U4 and U5, are stored in a portion of pending queue 512 termed the unsent pending queue 516.

Server 502 also sends collaborator mutations 506 to client computer 508, where the collaborator mutations are stored in a queue. Collaborator mutations 508 should also be applied to the first chunk of local spreadsheet 510, but are first reconciled with all pending user mutations, whether sent to the server or not, because both the user and collaborator mutations may affect one or more of the same cells. For example, user mutation U4 deletes row 5 of a spreadsheet, and a later-in-time collaborator mutation M1 sets cell A6 to the value "5". User mutation U4 shifts the location of the value of cell A6 and so collaborator mutation M1 is altered so that it sets the value of cell A5 rather than A6. Otherwise, if M1 is not changed and simply applied to the first chunk it will produce an incorrect state of the first chunk. Mutations may be reconciled using operational transformations or other known methods of consistency and concurrency control in collaborative document editing. Using operational transformations, collaborator mutation M1 is transformed against user mutation U4 to produce M1', where M1' is adjusted to reflect any changes imposed by U4.

Figure 6:
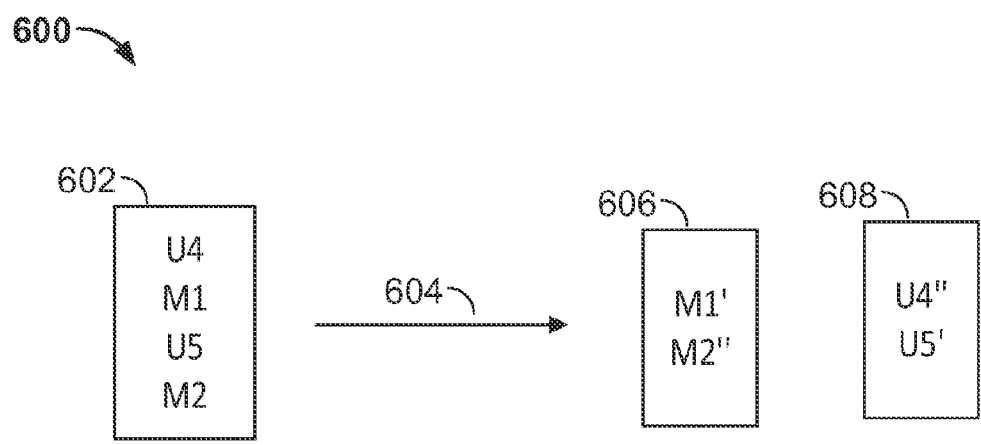
FIG. 6 shows a diagram for transforming pending mutations in accordance with an implementation as described herein.

An example of a transformation of user and collaborator mutations for a spreadsheet stored on a cloud computing system is shown in FIG. 6. A client computer has a local copy of a spreadsheet stored on a server, which includes a first chunk. A user enters user mutations U1 through U5 to the client computer, where they are stored in a pending queue on the client computer, such as pending queue 512 in FIG. 5. User mutations U1-U3 are sent from the client computer to the server, and the client computer has received a confirmation from the server that the mutations have been saved. Thus user mutations U1-U3 are removed from the pending queue. User mutation U4 has been sent to the server but no confirmation has been received. Thus user mutation U4 is stored in the sent pending queue. User mutation U5 has not been sent to the server yet, so it is stored in the unsent pending queue. Collaborator mutations M1 and M2 are received at the client computer from the server and should be applied to the first chunk on the client computer. However, they are first transformed against all the user mutations in the pending queue, namely U4 and U5. The order in time the mutations occur is U4, M1, U5, and then M2, illustrated at 602. When an operational transformation 604 is applied to the mutations, M1 is transformed against U4 to produce M1' while M2 is transformed against both U4 and U5 to produce M2". After M1 and M2 have been transformed to M1' and M2" respectively as shown at 606, they are applied to the first chunk of the spreadsheet. User mutations U4 and U5 in the pending queue are also transformed against collaborator mutations M1 and M2 before the user mutations are sent to the server. This ensures consistency between the user and collaborator mutations on both the server and client computer. Thus U4 is transformed against M1 and M2 to produce U4" while U5 is transformed against M2 to produce U5'. Transformed user mutations U4" and U5', shown at 608, may then be sent to the server for recordation in the mutation log. In this manner, the first chunk of the local spreadsheet on the client computer may be maintained in the correct, up-to-date state as user mutations and collaborator mutations are received at the client computer. In addition, correct, up-to-date user mutations may be sent to the server.

When a client computer sends a save request to the server, it may also send a chunk load request for an additional chunk of the spreadsheet. For example, a client computer may already have a first chunk of the spreadsheet loaded. The user makes several mutations to the chunk, which may affect values in a second chunk. For example, the user may insert or delete rows and columns, make changes to cell formulae or other dependencies in the first chunk, or make changes to cell values in the first chunk that are referenced in cells in the second chunk, all of which may affect the value of cells in the second chunk. The client computer sends these mutations to the server and also requests the second chunk. The channel by which the server sends collaborator mutations to the client computer is separate from the channel by which the server delivers chunks. Thus it may be that before the server can process the request and return a copy of the second chunk, the client computer may have received additional collaborator mutations from the server that have not been incorporated by the server into the second chunk. In addition, the user may have made additional mutations to the local spreadsheet while waiting for the second chunk. When the client computer receives the second chunk from the server, it has to update the second chunk with any user and collaborator mutations received during the interim.

Figure 7:
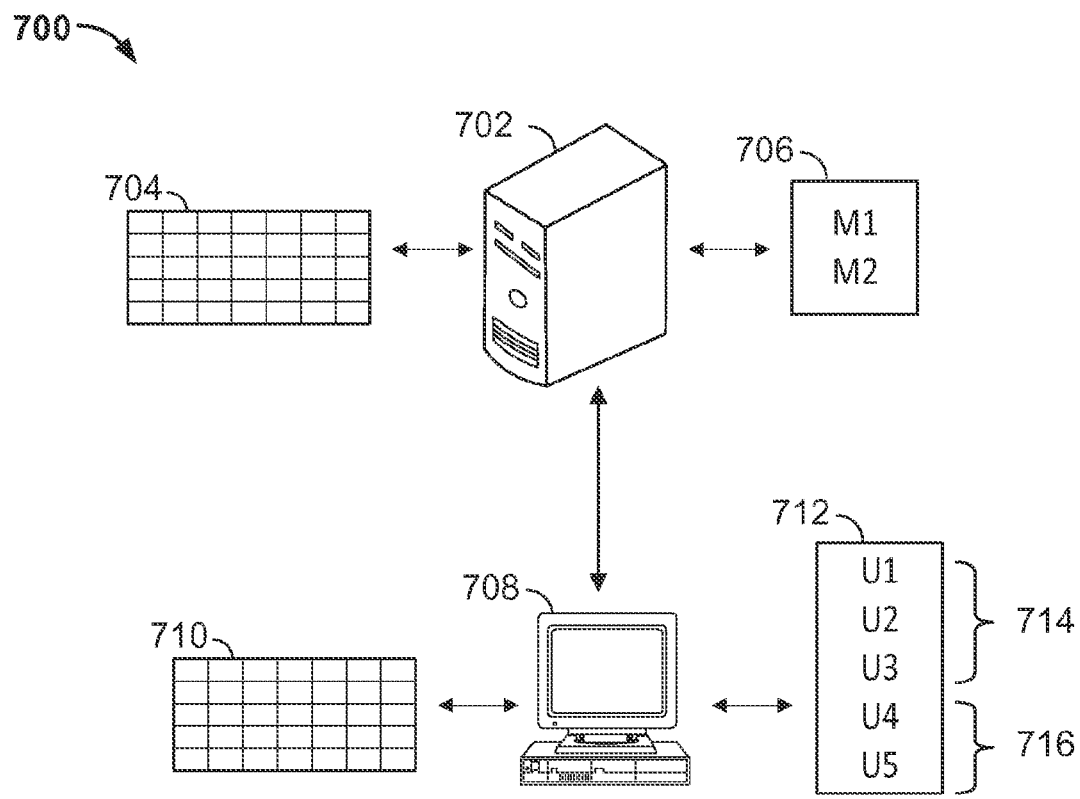
FIG. 7 shows another client-server system for resolving mutations in a partially-loaded spreadsheet model in accordance with an implementation as described herein.

System 700 of FIG. 7 shows a client-server system for delivering cloud computing and cloud storage services to a client computer. Client computer 708 connects with one or more servers 702 providing a cloud computing and cloud storage service. Server 702 stores spreadsheets, such as spreadsheet 704, that may be partially loaded onto client computer 708 using dynamically-sized chunks. Client computer 708 requests a first chunk of spreadsheet 704 from server 702. The server sends client computer 708 a copy of the first chunk so that client computer 708 has a local copy of the spreadsheet, shown as spreadsheet 710, which includes the first chunk sent by server 702. A user on client computer 708 is free to edit the chunk received from server 702. User mutations are stored in pending queue 712. User mutations U1-U3 are sent to server 702 as a save request and are stored in sent pending queue 714 of pending queue 712. Once server 702 sends client computer 708 a save confirmation, user mutations U1-U3 are removed from pending queue 714. Client computer 708 may also request a copy of a second chunk along with the save request. Server 702 generates a copy of the second chunk by applying the mutations in the mutation log (including mutations U1-U3) to an empty copy of the second chunk or a recent snapshot of the second chunk, if one is available. Server 702 then sends the second chunk to the client computer. If client computer 708 is not connected to the network when the chunk request is made (e.g. it is offline), then client computer 708 may retrieve the second chunk from local memory. For example, the second chunk may be stored in the cache of the web browser and is retrieved from local storage and displayed on client computer 708. During the time that server 702 is generating the second chunk (or during the time client computer 708 is retrieving the second chunk from local memory), client computer 708 receives two collaborator mutations 706 from server 702. The user on client computer also enters two additional user mutations U4 and U5 which are stored in unsent pending queue 716.

When client computer 708 receives the copy of the second chunk, the client computer incorporates the additional user and collaborator mutations. First, client computer 708 checks if the second chunk incorporates collaborator mutations 706. Server 706 assigns sequential revision numbers to each mutation. For example, M1 may be assigned revision number 6 and M2 may be assigned revision number 7. The second chunk also has an associated revision number. If the revision number of the second chunk is higher than the revision number of both collaborator mutations 706, then the second chunk incorporates both mutations. In this case, only the pending user mutations are applied to the copy of the second chunk. Thus user mutations U4 and U5 are transformed against collaborator mutations 706 before being applied to the second chunk. If the revision number of any collaborator mutation 706 is higher than the revision number of the second chunk, those collaborator mutations have not yet been applied to the second chunk. For example, if the second chunk is at revision number 10 and collaborator mutations M1 and M2 have been assigned revision numbers 11 and 12, the client computer first applies collaborator mutations M1 and M2 to the second chunk. Client computer 708 then transforms pending user mutations U4 and U5 against collaborator mutations 706 and applies the transformed user mutations to the second chunk.

Figure 8:
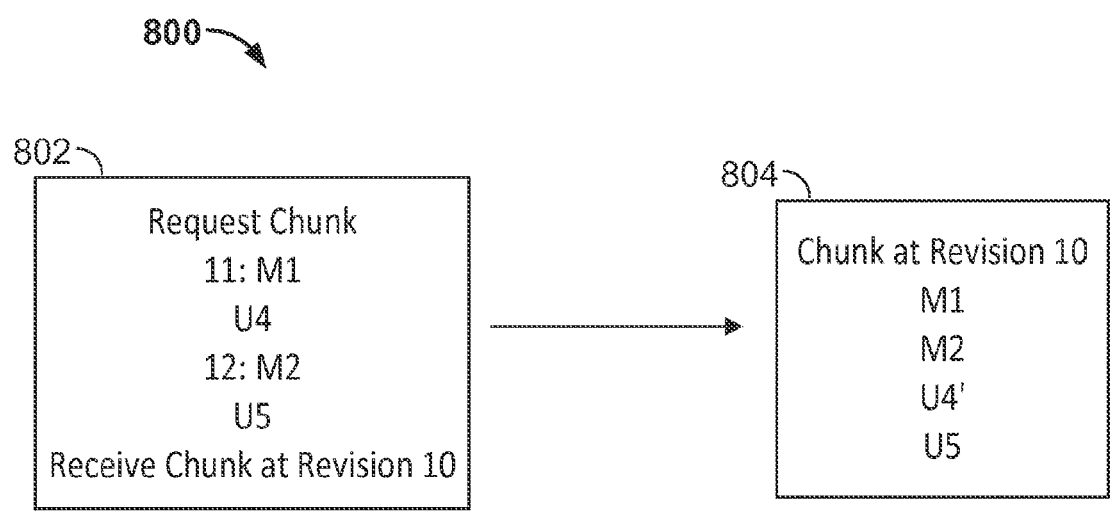
FIG. 8 shows another diagram for transforming pending mutations in accordance with an implementation as described herein.

An example of updating chunks received at a client computer is illustrated in FIG. 8. Flow 802 illustrates the order of events. In a client-server system such as illustrated in FIG. 7, a user is making edits to a local copy of a first chunk of a spreadsheet stored on a server. The client computer requests a copy of a second chunk, which may be in conjunction with a save request of user mutations of the first chunk. Alternatively, if the client computer is offline, a copy of the second chunk may be loaded from local memory. While the server is generating a copy of the second chunk to send to the client computer or while the client computer is loading the second chunk from local memory, the server receives collaborator mutations M1 with revision number 11 and M2 with revision number 12. The user also makes two additional mutations U4 and U5 that are stored in the pending queue. Mutation U4 was entered at a time between collaborator mutations M1 and M2, and U5 was entered after M2. After the user enters mutation U5, the client computer receives a copy of the second chunk at revision 10. Since the revision number of the second chunk is lower than both collaborator mutations M1 and M2, the second chunk is updated to incorporate those mutations. The second chunk is also updated with the pending user mutations U4 and U5, which are first transformed against the collaborator mutations. U4 is transformed once against M2 while U5 does not have to be transformed because it came last in time. Flow 804 shows the mutations that are applied to the chunk, including M1, M2, U4', and U5. If the second chunk had revision number 13, then collaborator mutations M1 and M2 have already been incorporated into the second chunk and do not need to be applied again by the client computer. Only the pending user mutations, transformed against collaborator mutations M1 and M2, are applied to the second chunk. In this manner, a client computer correctly updates a newly-loaded chunk that is received from a server (or from local memory) when additional user and collaborator mutations are received by the client computer between the time the chunk is requested and when it actually arrives. As previously described in relation to FIGS. 5 and 6, chunks currently loaded on the client computer are also updated. Thus all chunks of the spreadsheet, whether already loaded or newly received, are kept up-to-date by the client computer using the systems and methods described above.

Figure 9:
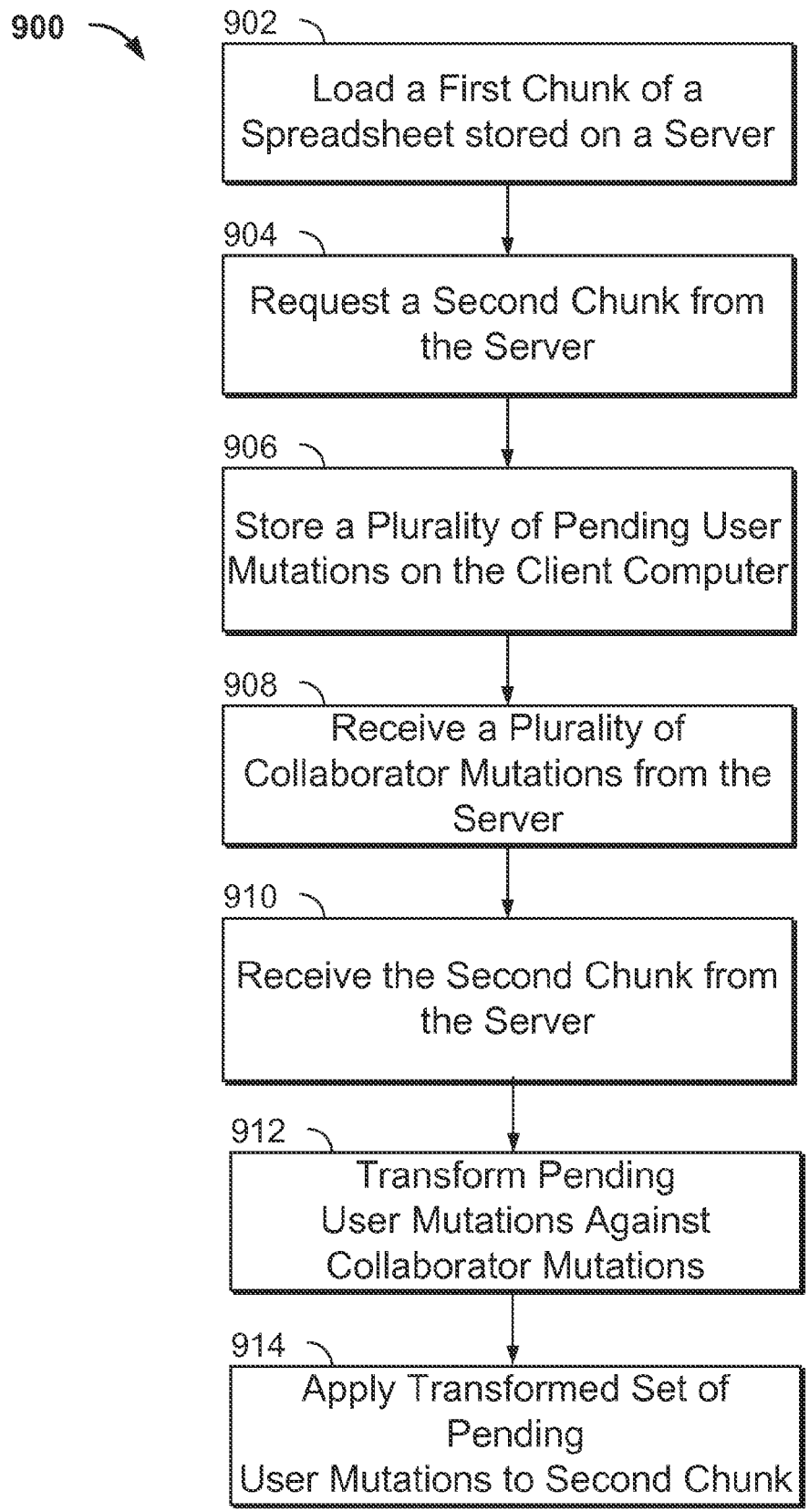
FIG. 9 shows a method for resolving mutations in a partially-loaded spreadsheet model in accordance with an implementation as described herein.

Methods for maintaining up-to-date chunks and resolving mutations in a partially-loaded spreadsheet model on a client computer are now described. One method of resolving mutations in a partially-loaded spreadsheet model is illustrated in FIG. 9. Method 900 includes loading onto a client computer a first chunk of a spreadsheet stored on a server, where the first chunk represents a first range of cells in the spreadsheet, and requesting a second chunk of the spreadsheet from the server, where the second chunk represents a second range of cells in the spreadsheet. The method further includes storing a plurality of pending user mutations on the client computer generated by a user on the client computer, and receiving from the server a plurality of collaborator mutations and the second chunk. The method further includes transforming the plurality of pending user mutations against the plurality of collaborator mutations, and applying the transformed plurality of pending user mutations to the second chunk. Method 900 may be performed on a client-server system such as illustrated in FIGS. 5 and 7, where the server provides cloud computing and cloud storage services.

Method 900 begins when a client computer loads a first chunk of a spreadsheet stored on a server, illustrated at 902. The spreadsheet is stored on the server as a partially-loaded model where the spreadsheet is broken into one or more chunks, each chunk representing a range of cells in the spreadsheet. The chunks are downloaded to the client computer when a user on the client computer views or edits cells within the range of the chunk. Multiple users may be accessing the spreadsheet simultaneously, and each client computer maintains a separate set of chunks for the same spreadsheet. The server receives mutations sent from each user and incorporates the mutations into a mutation log, such as illustrated in FIG. 4. Each mutation may be assigned a revision number. When a client computer requests a first chunk, the server generates a current version of the first chunk by applying all the mutations in the mutation log to an empty copy of the first chunk before sending the copy to the client computer. Alternatively, if a recent snapshot of the first chunk exists, the server may apply all mutations occurring in time after the snapshot and then send the modified copy of the snapshot to the client computer. For example, the snapshot is associated with a revision number and any mutations in the mutation log with a higher revision number are applied to the snapshot.

When the client computer receives the first chunk from the server, the user is free to view and edit the first chunk. Mutations entered by the user are stored in a pending queue, such as pending queue 712 in FIG. 7. Periodically, the client computer sends batches of user mutations to the server. The server saves the user mutations into the mutation log and sends the client computer an acknowledgement of the save. When the client computer receives the acknowledgement, the user mutations are moved out of the pending queue. At a later time, the client computer requests a second chunk from the server, illustrated at 904. This may happen, for example, if the user scrolls to a portion of the spreadsheet that is represented by the second chunk. The request for a second chunk may also coincide with a save request of pending user mutations. If the client computer is offline, the client computer may search local memory (e.g. browser cache) for a copy of the second chunk.

Between the time the request for a second chunk is sent and when the server sends the client computer the second chunk (or when the client computer locates a copy of the second chunk in local memory), the user may have made additional user mutations to the first chunk, illustrated at 906. The user mutations are stored in the pending queue. The pending queue may also store user mutations that have been sent to the server but for which no save acknowledgement has been received. The client computer also receives from the server collaborator mutations made by other users who are simultaneously editing the spreadsheet, illustrated at 908. The server sends collaborator mutations to the client computer independently of chunk load requests. Each collaborator mutation has an associated revision number assigned to it by the server, generally ordered chronologically. The collaborator mutations are applied to the first chunk on the client computer, but are first transformed against all pending user mutations in the pending queue using operational transformations. Transforming the collaborator mutations ensures that any potential conflicts between the collaborator mutations and the pending user mutations are resolved, for example if multiple mutations affect the same cell. Once the collaborator mutations are transformed, they are applied to the first chunk. In addition, the pending user mutations are transformed against the collaborator mutations before being sent to the server.

At a later time, the client computer receives the second chunk from the server, illustrated at 910. The server generates the second chunk by applying all the mutations in the mutation log to an empty copy of the second chunk before sending the copy to the client computer. Alternatively, if a recent snapshot of the second chunk exists, the server may apply all mutations occurring in time after the snapshot and then send the modified copy of the snapshot to the client computer. The mutation log does not include the pending user mutations stored in the pending queue on the client computer, and so the pending user mutations have not been incorporated into the second chunk received by the client computer. Alternatively, the client computer may load the second chunk from local memory. The second chunk is associated with a revision number.

When the client computer receives the second chunk, the client computer incorporates the pending user mutations stored in the pending queue into the second chunk. However, the client computer first transforms the pending user mutations against the collaborator mutations, illustrated at 912. Transforming the pending user mutations ensures that any potential conflicts between the collaborator mutations and the pending user mutations are resolved, for example if multiple mutations affect the same cell. After the pending user mutations are transformed, they are applied to the second chunk, illustrated at 914. In addition, any collaborator mutations with a higher revision number than the second chunk (i.e. collaborator mutations that have not already been incorporated into the second chunk by the server) are also applied to the second chunk. If no collaborator mutations have a higher revision number than the second chunk, no collaborator mutations need to be applied. After all the mutations are applied to the second chunk, the client computer may display the correct up-to-date second chunk to the user. In this manner, the client computer resolves user and collaborator mutations when loading and displaying chunks of a partially-loaded spreadsheet stored on a cloud computing and cloud storage system.

It will be apparent that aspects of the systems and methods described herein may be implemented in many different forms of software, firmware, and hardware in the implementations illustrated in the figures. The actual software code or specialized control hardware used to implement aspects consistent with the principles of the systems and method described herein is not limiting. Thus, the operation and behavior of the aspects of the systems and methods were described without reference to the specific software code—it being understood that one of ordinary skill in the art would be able to design software and control hardware to implement the aspects based on the description herein.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

What is claimed is:

1. A method for resolving mutations in a partially-loaded spreadsheet model, the method comprising:
   loading onto a client computer a first chunk of a spreadsheet stored on a server, wherein the first chunk represents a first range of cells in the spreadsheet;
   requesting a second chunk of the spreadsheet from the server, wherein the second chunk represents a second range of cells in the spreadsheet;
   storing a plurality of pending user mutations on the client computer generated by a user in a pending queue on the client computer, wherein the plurality of pending user mutations are applied to the first chunk, wherein each mutation in the plurality of mutations in the pending queue is labeled in a label as an unsent mutation;
   periodically sending, the plurality of pending user mutations from the client computer to the server to be applied to the spreadsheet and after sending the plurality of mutations to the server, changing the label of each mutation in the plurality of mutations from the unsent mutations to a sent mutation;
   receiving at the client computer, from the server, an acknowledgement after the plurality of pending user mutations are applied to the spreadsheet;
   deleting the plurality of pending user mutations from the pending queue after the client computer receives the acknowledgement from the server;
   receiving from the server a plurality of collaborator mutations;
   receiving from the server the second chunk;
   transforming the plurality of pending user mutations against the plurality of collaborator mutations; and
   applying the transformed plurality of pending user mutations to the second chunk.

2. The method of claim 1, wherein the transforming includes applying an operational transformation on the plurality of pending user mutations against the plurality of collaborator mutations.

3. The method of claim 1, wherein each collaborator mutation in the plurality of collaborator mutations is associated with a revision number and the second chunk is associated with a revision number.

4. The method of claim 3, the method further comprising applying to the second chunk each collaborator mutation with a revision number higher than the revision number of the second chunk.

5. The method of claim 3, wherein the revision numbers of each collaborator mutation and the second chunk is assigned by the server.

6. The method of claim 1, the method further comprising:
   transforming the plurality of collaborator mutations against the plurality of pending user mutations; and
   applying the transformed plurality of collaborator mutations to the first chunk.

7. The method of claim 1, wherein a first user mutation in the plurality of pending mutations affects a cell in the second range of cells.

8. The method of claim 1, wherein a first collaborator mutation in the plurality of collaborator mutations affects a cell in the first range of cells.

9. The method of claim 1, wherein the pending user mutations include user mutations that have not been sent to the server.

10. The method of claim 1, wherein the pending user mutations include user mutations that have been sent to the server but without an acknowledgement from the server that the user mutations have been saved.

11. A system for resolving mutations in a partially-loaded spreadsheet model, the system comprising:
    a client computer, wherein the client computer is configured to:
       communicate with a server using a communication connection;
       load a first chunk of a spreadsheet stored on the server, wherein the first chunk represents a first range of cells in the spreadsheet;
       request a second chunk of the spreadsheet from the server, wherein the second chunk represents a second range of cells in the spreadsheet;
       store a plurality of pending user mutations generated by a user on the client computer in a pending queue, wherein the plurality of pending user mutations are applied to the first chunk, wherein each mutation in the plurality of mutations in the pending queue is labeled in a label as an unsent mutation;
       periodically send, the plurality of pending user mutations from the client computer to the server to be applied to the spreadsheet and after sending the plurality of mutations to the server, changing the label of each mutation in the plurality of mutations from the unsent mutations to a sent mutation;
       receive at the client computer, from the server, an acknowledgement after the plurality of pending user mutations are applied to the spreadsheet;
       delete the plurality of pending user mutations from the pending queue after the client computer receives the acknowledgement from the server;
       receive from the server a plurality of collaborator mutations;
       receive from the server the second chunk;
       transform the plurality of pending user mutations against the plurality of collaborator mutations; and
       apply the transformed plurality of pending user mutations to the second chunk.

12. The system of claim 11, wherein the client computer transforms the plurality of pending user mutations by applying an operational transformation on the plurality of pending user mutations against the plurality of collaborator mutations.

13. The system of claim 11, wherein each collaborator mutation in the plurality of collaborator mutations is associated with a revision number and the second chunk is associated with a revision number.

14. The system of claim 13, wherein the client computer is further configured to apply to the second chunk each collaborator mutation with a revision number higher than the revision number of the second chunk.

15. The system of claim 13, wherein the revision numbers of each collaborator mutation and the second chunk is assigned by the server.

16. The system of claim 11, wherein the server is further configured to:
    transform the plurality of collaborator mutations against the plurality of pending user mutations; and apply the transformed plurality of collaborator mutations to the first chunk.

17. The system of claim 11, wherein a first user mutation in the plurality of pending user mutations affects a cell in the second range of cells.

18. The system of claim 11, wherein a first collaborator mutation in the plurality of collaborator mutations affects a cell in the second range of cells.

19. The system of claim 11, wherein the pending user mutations include user mutations that have not been sent to the server.

20. The system of claim 11, wherein the pending user mutations include user mutations that have been sent to the server but without an acknowledgement from the server that the user mutations have been saved.

21. A method for resolving mutations in a partially-loaded spreadsheet model, the method comprising:
    loading onto a client computer a first chunk of a spreadsheet stored on a server, wherein the first chunk represents a first range of cells in the spreadsheet;
    searching local memory of the client computer for a second chunk of the spreadsheet, wherein the second chunk represents a second range of cells in the spreadsheet;
    storing a plurality of pending user mutations on the client computer generated by a user on the client computer in a pending queue, wherein the plurality of pending user mutations are applied to the first chunk, wherein each mutation in the plurality of mutations in the pending queue is labeled in a label as an unsent mutation;
    periodically sending, the plurality of pending user mutations from the client computer to the server to be applied to the spreadsheet and after sending the plurality of mutations to the server, changing the label of each mutation in the plurality of mutations from the unsent mutations to a sent mutation;
    receiving at the client computer, from the server, an acknowledgement after the plurality of pending user mutations are applied to the spreadsheet;
    deleting the plurality of pending user mutations from the pending queue after the client computer receives the acknowledgement from the server;
    receiving from the server a plurality of collaborator mutations;
    retrieving the second chunk from the local memory;
    transforming the plurality of pending user mutations against the plurality of collaborator mutations; and
    applying the transformed plurality of pending user mutations to the second chunk.

22. The method of claim 21, wherein the local memory is a browser cache.

23. The method of claim 21, wherein the transforming includes applying an operational transformation on the plurality of pending user mutations against the plurality of collaborator mutations.

24. The method of claim 21, wherein each collaborator mutation in the plurality of collaborator mutations is associated with a revision number and the second chunk is associated with a revision number.

25. The method of claim 24, the method further comprising applying to the second chunk each collaborator mutation with a revision number higher than the revision number of the second chunk.

26. The method of claim 24, wherein the revision numbers of each collaborator mutation and the second chunk is assigned by the server.

27. The method of claim 21, the method further comprising:
    transforming the plurality of collaborator mutations against the plurality of pending user mutations; and
    applying the transformed plurality of collaborator mutations to the first chunk.

28. The method of claim 21, wherein a first user mutation in the plurality of pending user mutations affects a cell in the second range of cells.

29. The method of claim 21, wherein a first collaborator mutation in the plurality of collaborator mutations affects a cell in the first range of cells.

30. The method of claim 21, wherein the pending user mutations include user mutations that have not been sent to the server.

31. The method of claim 21, wherein the pending user mutations include user mutations that have been sent to the server but without an acknowledgement from the server that the user mutations have been saved.

* * * * *